March 13, 1951     J. SPITERI     2,545,009

BABY WALKING AND BALANCING DEVICE

Filed March 4, 1950

INVENTOR.
Joseph Spiteri
BY
Florian G. Miller
Atty.

Patented Mar. 13, 1951

2,545,009

UNITED STATES PATENT OFFICE 2,545,009

BABY WALKING AND BALANCING DEVICE

Joseph Spiteri, Erie, Pa., assignor of one-half to
C. Otto Birkland, Erie, Pa.

Application March 4, 1950, Serial No. 147,711

3 Claims. (Cl. 35—29)

This invention relates to a baby walking and balancing device for teaching a baby to walk.

In teaching a baby to walk, it has heretofore been necessary for the mother or the person who is teaching the baby to bend over deeply at the waist to bring them to the level of the baby so that they can hold the baby's hands. It places them in an unbalanced position so that they quickly tire. In this position, they cannot walk naturally with the result that they present poor suggestions to the baby being taught to walk. Also, they tend to support the baby by the hands so that it is difficult for the baby to learn to balance himself and walk. It is also difficult to hold a person's hands out far enough so that the baby is in a position to take a free, natural stride. Teaching a baby to walk is one of the most important parts of his education and upbringing and habits learned at this age extend through his life. It is, therefore, important that a proper device be provided to properly teach the baby to hold its balance and walk.

It is, accordingly, an object of my invention to provide a baby walking and balancing device for teaching babies to walk which is simple in construction, economical in cost, economical in manufacture, and efficient in use.

Another object of my invention is to provide a device for teaching a baby to walk which also teaches the baby to balance his body.

Another object of my invention is to provide a baby walking device for teaching a baby to walk which does not require tiresome bending of the body of the person teaching the child to walk.

Another object of my invention is to provide a baby walking device which may be held outwardly far enough from the body so that the child can take natural strides and the teacher may also be in an upright position to suggest the proper steps to be taken by the child.

Another object of my invention is to provide a baby walking and balancing device which may also be used as a clothes hanger.

Other objects of my invention will become evident from the following detailed description, taken in conjunction with the accompanying drawings, in which Fig. 1 is a perspective view of my novel baby walking device;

Figure 1:
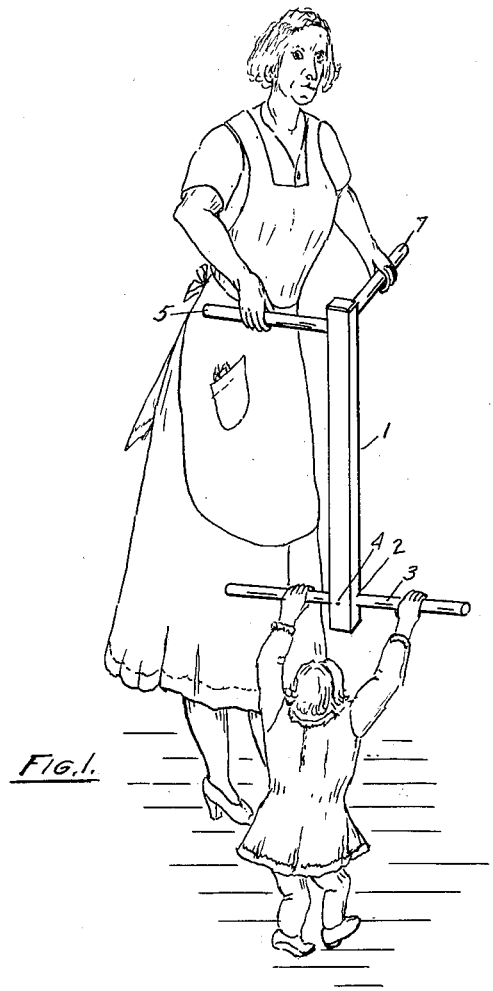
Figure 2:
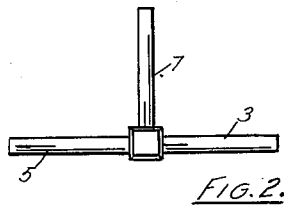
Fig. 2 is a plan view of my novel baby walking device.
Figure 3:
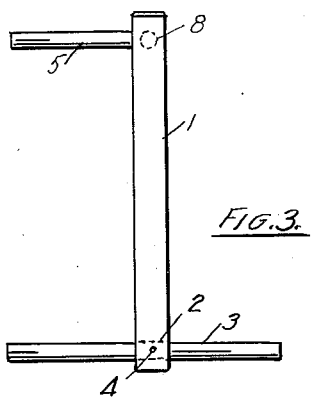
Fig. 3 is a side elevational view of my novel baby walking device.

Referring now to the drawings, I show in Figs. 1 to 3 inclusive a shaft 1 having a transverse aperture 2 in the lower end thereof for receiving a cross bar 3 which extends outwardly from opposite sides of the shaft 1 equi-distantly. The cross bar 3 is secured in the aperture 2 by means of a small nail 4 or it may be glued or otherwise secured therein. An arm 5 is secured in a recess (not shown) in the upper end of the shaft 1 and it is parallel to the cross bar 3 and extends outwardly from one side of the shaft 1 a distance equal to the outwardly extending distance of one side of the cross bar 3 on the lower end of the shaft 1. A second arm 7 is disposed in a recess 8 in the shaft 1 and it extends outwardly from the upper end of the shaft 1 at right angles to the arm 5 and the cross bar 3. The arm 7 extends outwardly a distance equal to the outward extension of the arm 5 and one side of the cross bar 3. The cross bar 3 may be in two pieces butted together in the aperture 2 and glued.

In the use of my novel baby walking device, a baby grasps the cross bar 3 as shown in Fig. 1 and the person teaching the baby to walk grasps the arms 5 and 7 as shown in Fig. 1. When the baby tends to fall forwardly out of balance, more pressure is exerted downwardly on the upper part of the arm 7 thereby bringing the baby to an upright position in balance. Likewise, when the baby tends to fall rearwardly, the arm 7 is pulled upwardly to draw the baby forwardly and counterbalance the extra force exerted by the baby falling off balance in a rearward direction. The arm 5 parallel to the cross arm 3 is utilized for exerting a counteracting force in an upward or a downward direction to counterbalance the off-balance sideward force exerted by the baby when he falls off balance to one side and exerts a greater pressure with his left or his right hand. Any excessive pressure exerted by either hand of the baby is counteracted by the hand of the teacher in an upward or a downward direction on the arm 5. By making the outward length of the arms 5 and 7 equal to the outwardly extending portion of the cross bar 3, the force exerted by the baby may be more easily counteracted by a counterforce on the arm 5 or 7. This tends to teach the baby to balance himself as well as walk inasmuch as the counterforce exerted may be more or less regulated. It will be evident upon inspecting my device in Fig. 1 that it may be held to the side of the teacher or the front of the teacher due to the right angled arms 5 and 7 and their relative position with relation to the cross bar 3.

Figure 4:
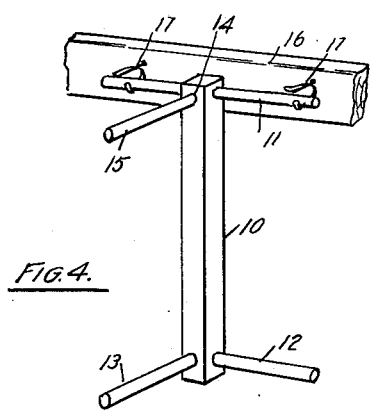
Fig. 4 is a side elevational view of a modified form of my invention.

In Fig. 4, I show a modified form of my invention wherein it may be used as a hanger for a child's clothes in a closet or the like. The shaft 10, cross bar 11, and arms 12 and 13 are all of the same construction as similar elements in Figs. 1 to 3 inclusive. The only addition is a recess 14 at right angles to the cross bar 11 to dispose an extra arm 15 parallel to arm 13 for hanging clothes thereon after my novel device has served its purpose in teaching a baby to balance himself and walk. The arm 12 may be removed and disposed in the recess 14 if desired. A wall bracket 16 having hooks 17 may be provided to hang my device by engagement of the cross bar 11 therewith; however, the cross bar may be hung over conventional hooks in a clothes closet.

It will be evident from the foregoing description that I have provided a novel baby walking and balancing device for teaching a baby to walk which also teaches the baby to balance himself, which permits the teacher and the baby to take a natural stride, which permits the baby to be placed along side of the teacher or in front of the teacher, and which does not require tiresome body bending of the teacher.

Various changes may be made in the specific embodiment of my invention without departing from the spirit thereof or from the scope of the appended claims.

What I claim is:

1. A baby walking and balancing device comprising a vertically extending shaft, a cross bar extending outwardly from opposite sides thereof on one end thereof to be grasped by a baby, and arms extending outwardly from the other end of said shaft, one parallel to said cross bar and the other at right angles thereto to be grasped by the person teaching a child to walk.

2. A baby walking and balancing device as set forth in claim 1 wherein all of said arms and said bar extend outwardly from said shaft an equal distance.

3. A baby walking and balancing device as set forth in claim 1 wherein a detachable bar extends outwardly from said shaft at right angles to said cross bar on the end of said shaft adjacent said cross bar.

JOSEPH SPITERI.

REFERENCES CITED

The following references are of record in the file of this patent:

UNITED STATES PATENTS

| Number | Name | Date |
| --- | --- | --- |
| 1,300,292 | Oshana | Apr. 15, 1919 |
| 1,332,461 | Bowden | Mar. 2, 1920 |
| 1,628,949 | Cathrine | May 17, 1927 |